US009856846B2

(12) United States Patent
Matsufuji et al.

(10) Patent No.: US 9,856,846 B2
(45) Date of Patent: Jan. 2, 2018

(54) ONBOARD CONTROLLER

(71) Applicant: Hitachi Automotive Systems, Ltd., Hitachinaka-shi, Ibaraki (JP)

(72) Inventors: Koji Matsufuji, Hitachinaka (JP); Toshio Hori, Hitachinaka (JP); Koji Onishi, Hitachinaka (JP); Yoshiaki Nagasawa, Hitachinaka (JP); Shigenori Nakazato, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 114 days.

(21) Appl. No.: 14/779,177

(22) PCT Filed: Feb. 7, 2014

(86) PCT No.: PCT/JP2014/052824
§ 371 (c)(1),
(2) Date: Sep. 22, 2015

(87) PCT Pub. No.: WO2014/156320
PCT Pub. Date: Oct. 2, 2014

(65) Prior Publication Data

US 2016/0053736 A1 Feb. 25, 2016

(30) Foreign Application Priority Data

Mar. 26, 2013 (JP) ................................ 2013-063197

(51) Int. Cl.
*G06F 19/00* (2011.01)
*F02N 11/08* (2006.01)
(Continued)

(52) U.S. Cl.
CPC .......... *F02N 11/0818* (2013.01); *F02D 29/02* (2013.01); *F02D 41/0097* (2013.01);
(Continued)

(58) Field of Classification Search
CPC .. B60W 10/06; B60W 10/02; B60W 2540/10; B60W 50/082; B60W 2520/04;
(Continued)

(56) References Cited

U.S. PATENT DOCUMENTS

2003/0149541 A1 8/2003 Takahashi et al.
2004/0149247 A1 * 8/2004 Kataoka ............... F02N 11/006 123/179.4

(Continued)

FOREIGN PATENT DOCUMENTS

DE 10 2010 001 257 A1 7/2011
DE 10 2010 001 762 A1 8/2011

(Continued)

OTHER PUBLICATIONS

International Search Report (PCT/ISA/210) issued in PCT Application No. PCT/JP2014/052824 dated May 20, 2014, with English translation (Four (4) pages).

(Continued)

*Primary Examiner* — John Kwon
*Assistant Examiner* — Tea Holbrook
(74) *Attorney, Agent, or Firm* — Crowell & Moring LLP

(57) ABSTRACT

Provided is a system of carrying out engagement of a pinion and a ring gear at optimal timing and suppressing a bite-in sound, in a vehicle including an idle stop system. In a vehicle control device including an automatic stop unit which automatically stops an engine on the basis of an operating state of a vehicle; an automatic start unit which controls a starter during a period until the engine completely stops after the automatic stop unit executes the automatic stop of the engine, and restarts the engine; and an engine rotation detection unit which detects or operates a crank phase or a rotation number of the engine, the automatic start unit determines a control command of the starter at an
(Continued)

interval shorter than an update interval of a signal of the engine rotation detection unit.

13 Claims, 12 Drawing Sheets

(51) Int. Cl.

| | |
|---|---|
| ***F02D 29/02*** | (2006.01) |
| ***F02D 41/00*** | (2006.01) |
| *F02D 41/12* | (2006.01) |
| *F02B 75/12* | (2006.01) |
| *F02N 15/06* | (2006.01) |
| *F02P 3/02* | (2006.01) |
| *F02D 41/04* | (2006.01) |

(52) U.S. Cl.
CPC .... *F02N 11/0855* (2013.01); *F02B 2075/125* (2013.01); *F02D 41/042* (2013.01); *F02D 41/123* (2013.01); *F02D 2200/101* (2013.01); *F02N 15/067* (2013.01); *F02N 2200/021* (2013.01); *F02N 2200/022* (2013.01); *F02N 2200/041* (2013.01); *F02N 2200/048* (2013.01); *F02N 2200/062* (2013.01); *F02N 2200/063* (2013.01); *F02N 2200/064* (2013.01); *F02N 2200/0801* (2013.01); *F02P 3/02* (2013.01)

(58) Field of Classification Search
CPC .. F02D 41/042; F02D 17/00; F02D 2200/101; F02D 29/02; F02D 41/0097; F02D 41/123; F16H 63/50; F02N 11/0814; F02N 11/0803; F02N 11/0818; F02N 11/0851; F02N 2200/021; F02N 11/0855; F02N 15/067; F02N 2200/022; F02N 2200/041; F16D 43/04; F02B 2075/125
USPC .......................................................... 701/112
See application file for complete search history.

(56) References Cited

U.S. PATENT DOCUMENTS

| | | | | |
|---|---|---|---|---|
| 2004/0194749 | A1* | 10/2004 | Yonezawa ................ | F01L 1/02 123/179.5 |
| 2010/0180849 | A1 | 7/2010 | Senda et al. | |
| 2011/0137544 | A1* | 6/2011 | Kawazu ............. | F02N 11/0855 701/113 |
| 2011/0184626 | A1* | 7/2011 | Mauritz .............. | F02N 11/0855 701/102 |
| 2012/0035827 | A1* | 2/2012 | Kuniyoshi .......... | F02N 11/0855 701/102 |
| 2012/0312269 | A1* | 12/2012 | Fujiwara ................ | F02N 15/06 123/179.4 |
| 2013/0036809 | A1* | 2/2013 | Cwik ................. | F02N 11/0855 73/115.05 |
| 2013/0054185 | A1 | 2/2013 | Cwik et al. | |
| 2013/0080037 | A1* | 3/2013 | Fujiwara ............ | F02N 11/0822 701/113 |
| 2013/0180490 | A1* | 7/2013 | Odahara ................ | F02N 15/00 123/179.4 |
| 2013/0268181 | A1* | 10/2013 | Nagasawa ........... | F02N 11/0814 701/112 |
| 2013/0325246 | A1 | 12/2013 | Roessle et al. | |
| 2015/0025779 | A1* | 1/2015 | Uchida ................ | F02D 41/009 701/104 |
| 2015/0096535 | A1* | 4/2015 | Kitano .................. | F02D 41/065 123/406.53 |
| 2015/0219060 | A1* | 8/2015 | Nakashima ......... | F02N 11/0818 701/103 |
| 2016/0053736 | A1* | 2/2016 | Matsufuji ........... | F02N 11/0855 701/112 |

FOREIGN PATENT DOCUMENTS

| | | | |
|---|---|---|---|
| DE | 10 2010 061 769 | A1 | 5/2012 |
| EP | 0 401 757 | A2 | 12/1990 |
| FR | 2 964 158 | A1 | 3/2012 |
| JP | 2002-257841 | A | 9/2002 |
| JP | 2005-330813 | A | 12/2005 |
| JP | 2008-106720 | A | 5/2008 |
| JP | 2010-190208 | A | 9/2010 |
| JP | 2010-270635 | A | 12/2010 |
| JP | 2012-36747 | A | 2/2012 |
| JP | 2012-36777 | A | 2/2012 |

OTHER PUBLICATIONS

Extended European Search Report issued in counterpart European Application No. 14774007.0 dated Dec. 13, 2016 (seven (7) pages).

* cited by examiner

ONBOARD CONTROLLER

TECHNICAL FIELD

The present invention relates to a vehicle control device, and particularly to a control device of an idle-stop vehicle that performs stop and restart of an engine automatically.

BACKGROUND ART

Recently, vehicle technology for the purpose of saving energy resources and preserving an environment has been developed. For example, there is a vehicle on which an idle stop system of cutting fuel supplied to an engine and removing torque generated by the engine when a predetermined condition (automatic stop condition) is established during operation is mounted. The automatic stop condition of the engine is established, for example, when a driver releases the foot from an accelerator or steps on the brake. Subsequently, the engine restarts at a point of time when a restart request from the driver is generated, or when the operation of the engine becomes necessary.

As a method of restarting the engine, there is adopted a method of using a starter of a pinion extrusion type to extrude a pinion of the starter to a ring gear side of the engine and engage the pinion with the ring gear, transmitting rotation of the starter to the engine, rotating the engine, and starting the engine.

For example, PTL 1 proposes a method of quickening recovery of rotation of the engine by starting to supply power to a motor of the starter and rotating the pinion when a condition such as stepping on the accelerator is established during inertial rotation after the torque generated by the engine is removed and a restart request is generated, engaging the pinion with the ring gear at a point of time when a rotation speed of the pinion is synchronized with a rotation speed of the ring gear, and starting cranking by the starter. PTL 1 discloses predicting a future rotation speed of the engine by operating kinetic energy of the engine and an amount of work that disturbs motion of the engine, and predicting future kinetic energy.

CITATION LIST

Patent Literature

PTL 1: JP-A-2005-330813

SUMMARY OF INVENTION

Technical Problem

When the automatic stop condition of the engine is established and subsequently the pinion of the starter is engaged in advance with the ring gear during a period of the inertial rotation after the torque generated by the engine is removed, it is desirable to engage the pinion with the ring gear at almost a zero rotation speed of the engine in order to reduce the bite-in sound as much as possible. However, when the restart request from the driver is generated, there exists a request for restarting the engine as quickly as possible. It is desirable to engage the pinion in advance with the ring gear at a high rotation speed of the engine in order to prepare for this request. Meanwhile, the starter of the pinion extrusion type has delay time until the pinion is extruded and arrives at the ring gear, and it is necessary to predict the rotation speed of the engine at a point of time when the pinion arrives at the ring gear at extrusion timing of the pinion.

During the period of the inertial rotation of the engine, the rotation speed of the engine increases and decreases repetitively and decreases pulsatively. For this reason, in order to engage the pinion with the ring gear during the period of the inertial rotation of the engine, it is necessary to predict the rotation speed of the engine decreasing pulsatively and engage the pinion with the ring gear at any rotation speed of the engine satisfying both suppression of the bite-in sound and the preparation for the restart request.

Here, in a rotation sensor of an electromagnetic pickup type used generally for detecting the engine rotation number, an output interval of the sensor increases in a region where the rotation speed of the ring gear is low, due to resolution limited by a tooth interval of pulsars. In this case, in the method described in PTL 1, there is a problem in starter operation timing such as engagement of the pinion that cannot be controlled in a period in which an output of a crank angle sensor is not updated.

The present invention has been made to solve the above problems and a main object thereof is to carry out a starter operation command at optimal timing, even in a region of an engine rotation number where an output interval of a rotation sensor with respect to the engine rotation number is long.

Solution to Problem

In order to achieve the above object, provided is a vehicle control device of the present invention including: an automatic stop unit which automatically stops an engine on the basis of an operating state of a vehicle; an automatic start unit which controls a starter during a period until the engine completely stops after the automatic stop unit executes the automatic stop of the engine, and restarts the engine; and an engine rotation detection unit which detects or estimates a crank phase or a rotation number of the engine, wherein the automatic start unit determines a control command of the starter at an interval shorter than an update interval of a signal of the engine rotation detection unit.

Advantageous Effects of Invention

According to the present invention, starter operation determination or control is executed at an interval shorter than a signal interval of an engine rotation sensor, in a region of any engine rotation number. For this reason, a starter operation command can be carried out at optimal timing.

DESCRIPTION OF EMBODIMENTS

An embodiment of a vehicle control device according to the present invention will be described hereinafter with reference to FIGS. 1 to 13.

Figure 1:
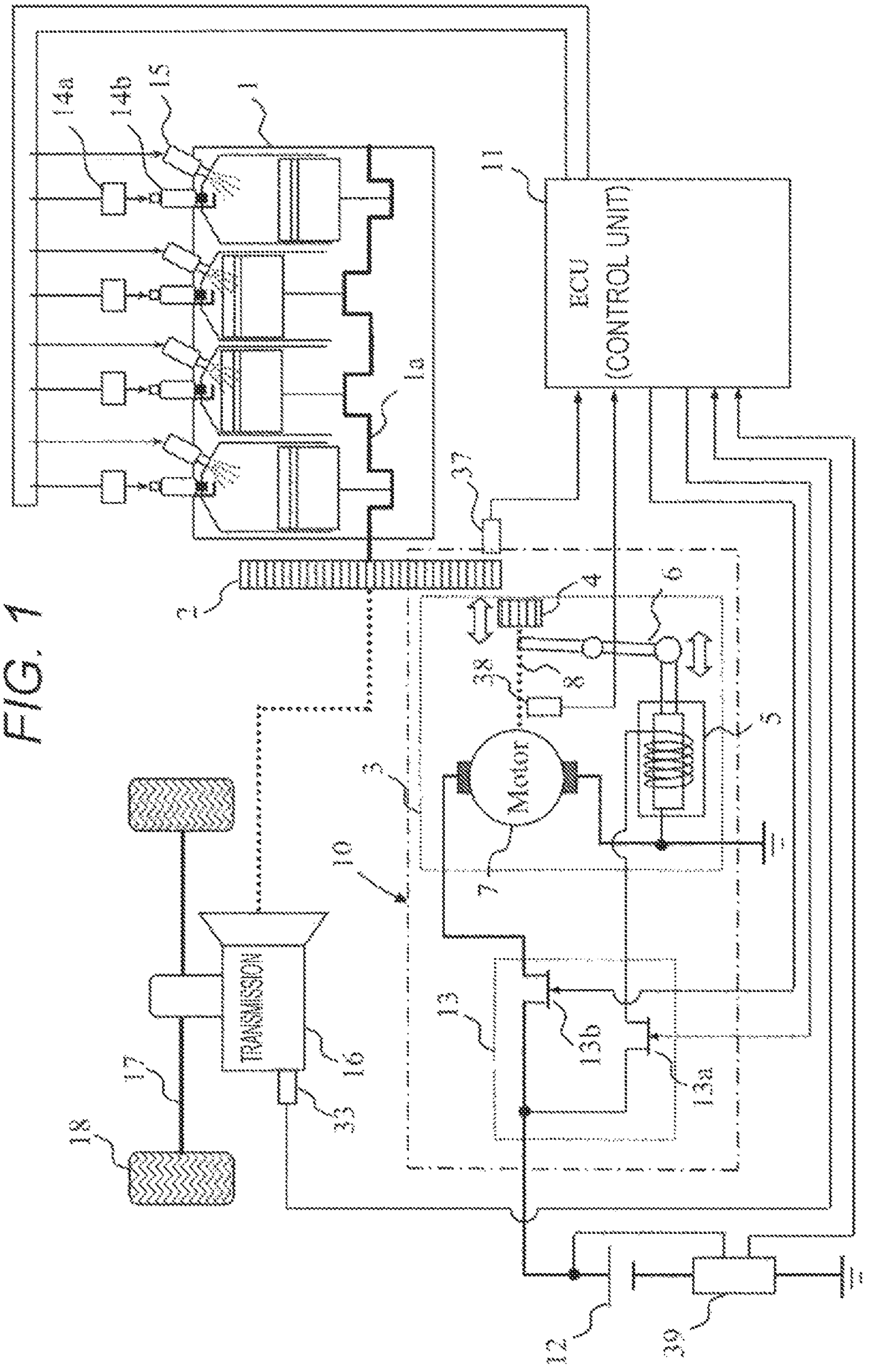
FIG. 1 is a diagram illustrating an outline of an entire configuration of a vehicle.

FIG. 1 is an entire configuration diagram of a vehicle on which a vehicle control device according to the present invention is mounted. Note that in FIG. 1, portions relating to description of the vehicle control device according to the present invention will be mainly described and description of other portions is omitted. The vehicle includes a multiple cylinder engine (internal-combustion engine body) 1, an idle stop starter system 10, and a control unit (ECU: controller) 11. The internal-combustion engine body (also simply referred to as the internal-combustion engine) 1 has a crank shaft 1*a*, and an ignition coil 14*a*, an ignition plug 14*b*, a fuel injection valve 15 and the like are attached to the internal-combustion engine body 1. The idle stop starter system 10 includes a starter body 3 of a pinion gear extrusion type and a semiconductor switching element 13, and is controlled by the ECU 11. Note that the semiconductor switching element 13 may be replaced with a mechanical magnet switch operated by ON and OFF signals.

A ring gear 2 is attached to the crank shaft 1*a* of the internal-combustion engine body 1. The starter body 3 is provided with an actuator 5 driven by the semiconductor switching element 13, a motor 7, and a pinion gear 4. A pulse sensor 37 that detects unevenness of the ring gear 2 and converts the detected unevenness into a pulse signal is provided in the vicinity of the ring gear 2. The ECU 11 calculates a rotation number of the engine 1 (engine rotation number) on the basis of the pulse signal output from the pulse sensor 37.

The starter body 3 includes the pinion gear 4, the actuator 5, a lever 6, the starter motor 7, and a pinion pulse sensor 38. The pinion gear 4 is a gear that can engage with the ring gear 2, and is provided to be movable in an axial direction to a shaft (pinion shaft) 8 of the starter motor 7. The actuator 5 is an electric actuator for moving the pinion gear 4 in the axial direction of the pinion shaft 8 via the lever 6. The starter motor 7 is a motor for cranking the engine 1 as described below. The pinion pulse sensor 38 is a sensor for detecting a rotation speed of the pinion shaft 8.

When a pinion transfer command of the ECU 11 is input to a gate terminal of a semiconductor switching element 13*a* for pinion transfer actuator drive, power of a battery 12 is supplied to the actuator 5. Accordingly, since the actuator 5 moves the pinion gear 4 in a rightward direction as shown via the lever 6, the pinion gear 4 engages with the ring gear 2.

When a motor drive command from the ECU 11 is input to a gate terminal of a semiconductor switching element 13*b* for starter motor drive, the power of the battery 12 is supplied to the starter motor 7. Accordingly, the starter motor 7 rotates the crank shaft 1*a* via the pinion gear 4 and the ring gear 2 and cranks the engine 1.

Note that a transmission 16 is connected to the crank shaft 1*a*. The transmission 16 transmits rotation drive force generated in the internal-combustion engine body 1 to a road surface via a drive shaft 17 and a tier 18. In addition, a vehicle speed sensor 33 which detects a rotation pulse of an output shaft of the transmission 16 is attached to the transmission 16. The ECU 11 performs conversion by a predetermined coefficient, on the basis of an output signal from the vehicle speed sensor 33, and calculates a vehicle speed value.

A battery sensor 39 is connected to a minus terminal side of the battery 12. The battery sensor 39 detects a battery voltage, a battery current, and an ambient temperature of the battery, and outputs the detected information to the ECU 11.

Figure 2:
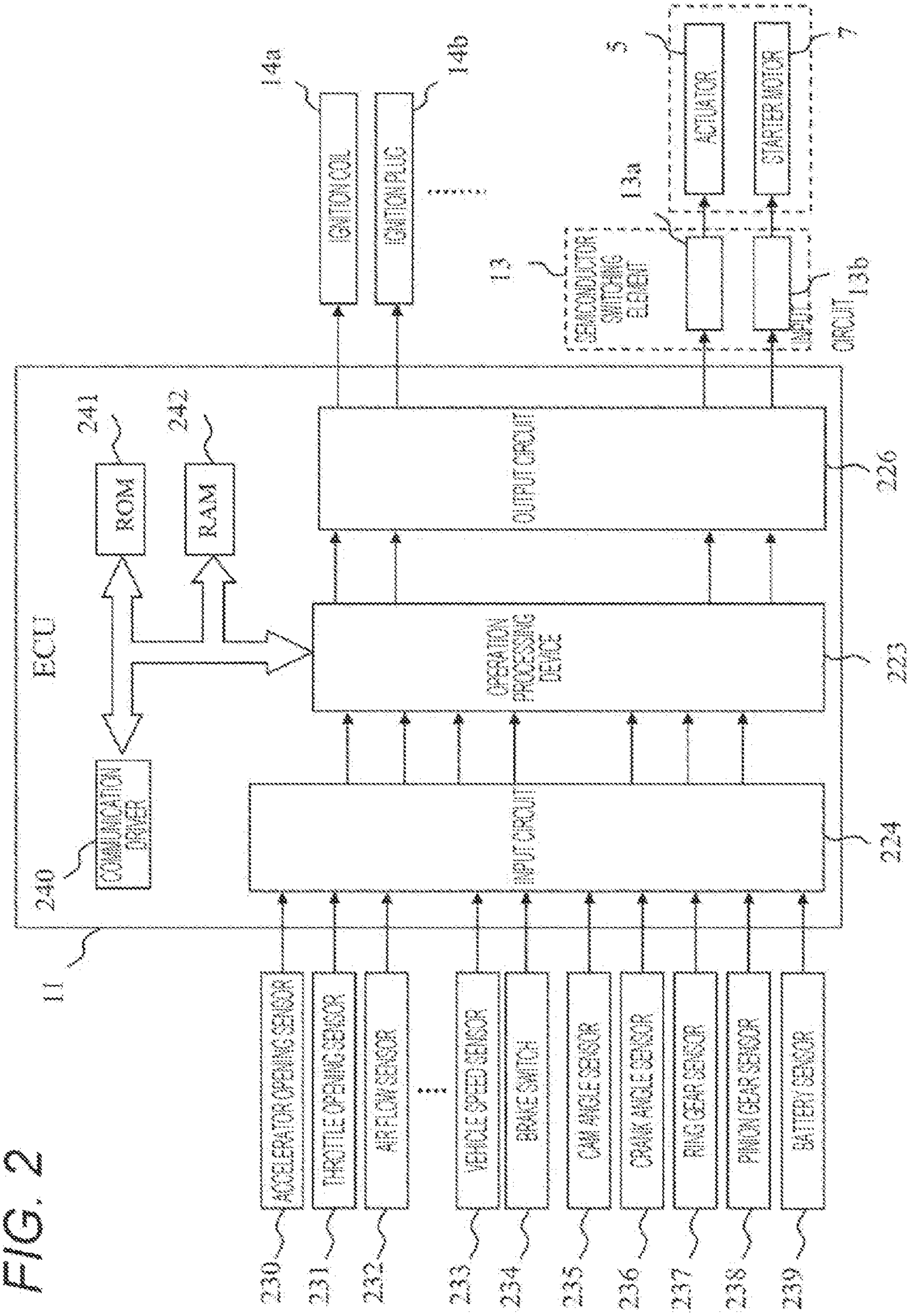
FIG. 2 is a diagram illustrating a control device.

FIG. 2 is a diagram illustrating a system configuration of the ECU 11, together with various input signals input from the sensors and the like to the ECU 11, and various output signals output from the ECU 11 to a control apparatus and the like.

An accelerator opening sensor 230 which detects a stepping-in amount of an accelerator pedal (not shown) of the vehicle, a throttle opening sensor 231 which detects an opening degree of a throttle valve (not shown), an air flow sensor 232 which measures an amount of air sucked into cylinders of the engine 1, a vehicle speed sensor 233 which detects a travel speed of the vehicle, a brake switch 234 which detects an operation of a foot brake (not shown), a cam angle sensor 235 and a crank angle sensor 236 which detect a cam angle signal and a crank angle signal used for calculation of ignition and injection timing and cylinder determination of the engine 1, the above-described ring gear sensor 237 and pinion gear sensor 238, and a battery sensor 239 which detects the battery voltage, the battery current, and the ambient temperature of the battery and outputs information are connected to an input circuit 224 of the ECU 11.

An operation processing device 223 executes an operation process according to a predetermined program read from a ROM 241. The operation processing device 223 gives a command to an output circuit 226 on the basis of an output from the input circuit 224, data read from a RAM 242, reception data from another control device obtained via a communication driver 240, and the like. The ignition coil 14*a*, the fuel injection valve 15, and the semiconductor switching element 213 are connected to the output circuit 226. When the ignition coil 14*a* receives an ignition signal output from the output circuit 226 on the basis of ignition timing calculated by the operation processing device 223 from signals of the cam angle sensor 235 and the crank angle sensor 236, the ignition coil 14*a* supplies power of a high voltage to the ignition plug 14*b* in order to ignite an air-fuel mixture inside the cylinders by the ignition coil 14*a*. When the fuel injection valve 15 receives a valve opening signal output via the output circuit 226 at predetermined timing for predetermined time, the fuel injection valve 15 injects fuel. Note that the ECU 11 calculates an amount of fuel to be injected by the fuel injection valve 15 from an amount of air sucked measured by the air flow sensor 232.

When the semiconductor switching element 213 receives a PWM drive signal output via the output circuit 26, the semiconductor switching element 213 drives the actuator 5 and the starter motor 7. The switching element 213*a* drives the actuator 5 and the switching element 213*b* drives the starter motor 7. Note that when the ECU 11 receives a drive request for the starter 3, the ECU 11 outputs the PWM drive signal via the output circuit 226.

Figure 3:
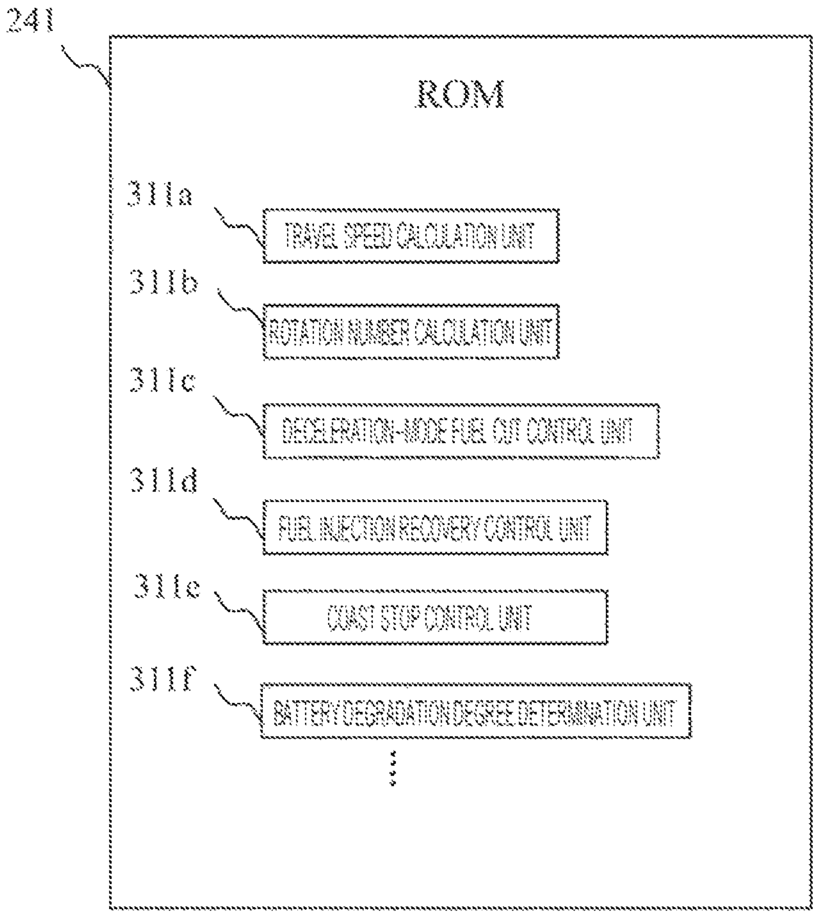
FIG. 3 is a diagram illustrating the control device.

FIG. 3 is a diagram illustrating a function of the ECU 11. A travel speed calculation unit 311*a*, a rotation number calculation unit 311*b*, a deceleration-mode fuel cut control unit 311*c*, a fuel injection recovery control unit 311*d*, a coast stop control unit 311*e*, and the like are stored as programs in the ROM 241 of the ECU 11 and are executed by the operation processing device 223. The travel speed calculation unit 311*a* performs conversion by a predetermined coefficient, on the basis of an output signal from the vehicle speed sensor 233, and calculates a vehicle speed value. The rotation number calculation unit 311*b* calculates an engine rotation number on the basis of the output signal from the ring gear sensor 37.

When a predetermined deceleration-mode fuel cut condition is satisfied, the deceleration-mode fuel cut control unit 311*c* controls the fuel injection valve 15 so as to stop supplying of the fuel to the engine 1 during deceleration of the vehicle. In a case where the engine rotation number is equal to or less than a fuel injection recovery rotation number when supplying of the fuel to the engine 1 is stopped by the deceleration-mode fuel cut control unit 311*c*, the fuel injection recovery control unit 311*d* controls the fuel injection valve 15 so as to resume supplying of the fuel to the engine 1.

When a predetermined coast stop condition including at least one condition where a vehicle speed is equal to or less than a coast stop permission vehicle speed, the coast stop control unit 311*e* controls the fuel injection valve 15 so as to stop supplying of the fuel to the engine 1.

Figure 4:
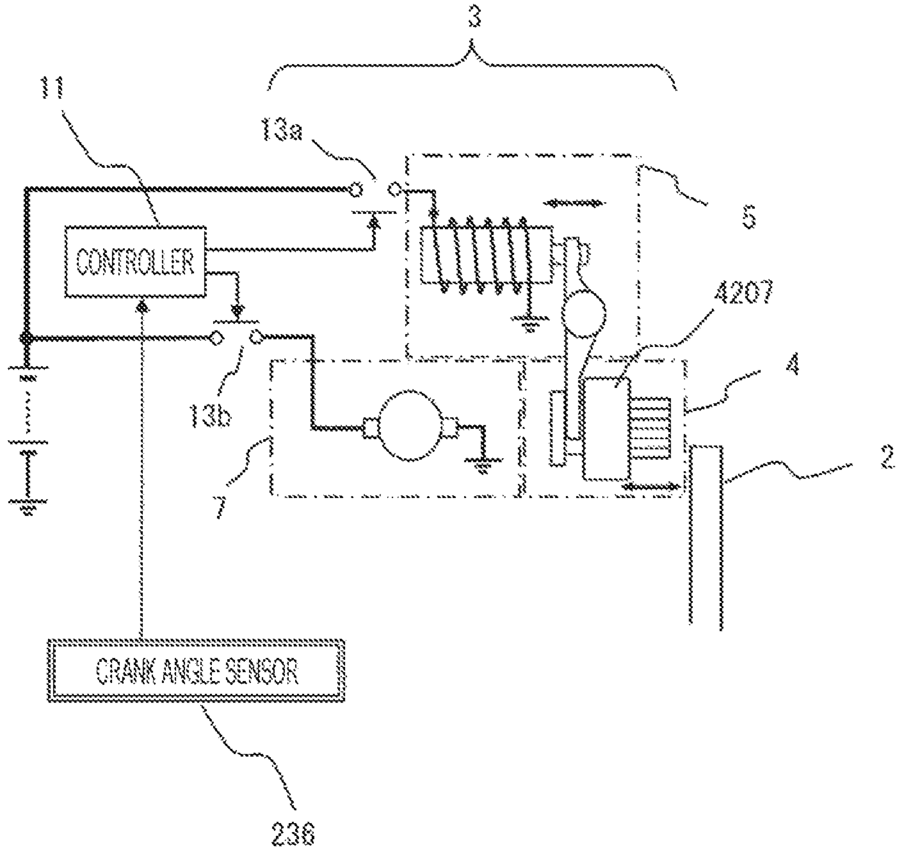
FIG. 4 is a diagram illustrating a starter motor.

FIG. 4 is a schematic diagram of simple structures and circuit connection of the starter body 3 and the ECU 11 in this embodiment. Note that the starter body 3 may be controlled by a controller different from the ECU 11 which controls the engine 1; however, in this embodiment, the starter body 3 is described as being controlled by the ECU 11. The starter body 3 is a so-called starter of a pinion extrusion type and includes the starter motor 7, the pinion gear 4 which is driven to rotate by the starter motor 7, and a magnet switch 5 for extruding the pinion gear 4. The rotation of the starter motor 7 is decelerated by a deceleration mechanism inside the starter motor 7 to increase torque and the torque is transmitted to the pinion gear 4. When power is supplied to the magnet switch 5, the pinion gear 4 is extruded (a rightward direction in FIG. 4) and is connected to the ring gear 2. When a function of extruding the pinion gear 4 is included, the magnet switch may not be provided. The pinion gear 4 is integrated with a one-way clutch 4207.

The pinion gear 4 is movable in an axial direction of the starter motor 7. The pinion gear 4 engages with the ring gear 2 connected to the crank shaft of the engine and rotates. Accordingly, the pinion gear 4 can transmit power to the engine. The one-way clutch 4207 transmits power only in a direction in which the starter motor 7 rotates the engine forward. Accordingly, when the one-way clutch 4207 engages with the pinion gear 4 and the ring gear 2, a rotation speed of the ring gear becomes a synchronous speed with respect to a rotation speed of the starter motor 7 according to a deceleration ratio or becomes a rotation speed higher than the rotation speed of the starter motor 7. That is, when the rotation speed of the ring gear 2 is about to become lower than the rotation speed of the pinion gear 44, the one-way clutch 4207 transmits power. For this reason, the rotation speed of the ring gear 2 does not become lower than the synchronous speed with respect to the starter motor 77. Meanwhile, when the rotation speed of the ring gear is higher than the synchronous speed, the one-way clutch does not transmit power. For this reason, the power is not transmitted from the ring gear 2 to the side of the starter motor 77.

As illustrated in FIGS. 1 and 4, signals from the pinion pulse sensor 38 (pinion rotation speed detection unit), the pulse sensor 37 of the ring gear (ring gear rotation speed detection unit), and the crank angle sensor 236 (crank angle detection unit) are input to the ECU 11. Note that since the ring gear 2 and the crank shaft of the engine are connected to each other, the ring gear rotation speed and the engine rotation speed may be considered as the same meaning. The ECU 11 permits an idle stop according to various kinds of information such as a brake pedal state and a vehicle speed, in addition to normal fuel injection, ignition, and air control (electronic control throttle), and performs fuel cut. A pinion extrusion command signal and a motor rotation command signal are output independently from the controller. As illustrated in FIG. 4, the switch 13*a* for supplying power to the magnet switch, which transmits the pinion extrusion command signal and the switch 13*b* for supplying power to the starter motor, which transmits the motor rotation command signal control pinion extrusion and rotation of the starter motor 7. Relay switches having mechanical contacts or switches using semiconductors can be used as components which execute functions of the switches.

Incidentally, the restart after the automatic stop of the engine 11 is desirably carried out as quickly as possible upon a restart request. In addition, when the pinion gear 4 is engaged with the ring gear 2, there is a risk that a bite-in sound of the pinion gear 4 and the ring gear 2 is generated to give unpleasant feeling to a driver. Therefore, in this embodiment, in order to restart the engine 11 quickly and suppress the bite-in sound of the pinion gear 4 and the ring gear 2, engagement of the pinion gear 4 and the ring gear 2 is carried out during an inertial rotation period of the engine 1 after the automatic stop of the engine, at the restart after the automatic stop of the engine.

Specifically, when there is the automatic stop request of the engine 1, the fuel injection and the ignition are stopped upon the stop request. Accordingly, the engine 1 rotates inertially. In the period of the inertial rotation, an ON signal is output to the switch 13*a* for supplying power to the magnet switch, and supplying of power to the coil 5 starts. Accordingly, the pinion gear 4 is extruded to the side of the ring gear 2 in an axial direction of the rotation shaft of the pinion gear and the pinion gear 4 engages with the ring gear 2 before the engine 1 completely stops (in the period of the inertial rotation). When there is the engine restart request under the engagement state, an ON signal is output to the drive relay 206*a* and supplying of power to the motor 11 starts. Accordingly, the pinion gear 4 is driven to rotate, and the ring gear 2 is driven to rotate by the rotation of the pinion gear 4. Accordingly, cranking is performed.

Here, it is necessary to engage the pinion gear 4 and the ring gear 2 immediately before the inertial rotation of the engine 1 stops, specifically, in a region where a relative rotation speed of the ring gear 2 with respect to the pinion gear 4 is in a predetermined extremely-low rotation speed range (for example, 0±100 rpm), in order to reduce the bite-in sound as much as possible. Particularly, when the engine rotation speed is zero, an effect of suppressing the sound is high.

Meanwhile, in a rotation sensor of an electromagnetic pickup type used as the crank angle sensor 236 in this embodiment, there is a limitation in the engine rotation speed at which an NE signal can be output, and there is a case where the engine rotation speed in an extremely low rotation speed region (for example, a region of 200 to 300 rpm or less) cannot be calculated with high precision. This is because a passage signal of a tooth portion (protrusion 26)

cannot detect the engine rotation number in predetermined operation time in the rotation sensor, in the region where the engine rotation speed is extremely low. However, a rotation speed region where the bite-in sound of the pinion gear 4 and the ring gear 2 can be suitably suppressed is included in a rotation speed region that cannot be calculated from the NE signal. For this reason, there is a risk that drive control of the pinion gear 4 cannot be carried out appropriately at an engine rotation speed calculated on the basis of the NE signal. That is, the engagement of the pinion gear 4 and the ring gear 2 cannot be carried out at optimal timing. As a result, there is a risk that the bite-in sound increases.

Therefore, in this embodiment, in the period of the inertial rotation after the automatic stop of the engine 1, a rotation orbit of the inertial rotation of the engine is predicted on the basis of the engine rotation speed calculated on the basis of the NE signal. Then, engagement timing of the pinion gear 4 and the ring gear 2 is controlled on the basis of the predicted rotation orbit. Specifically, in the prediction of the rotation orbit, an instant rotation speed is calculated on the basis of the NE signal and the above-described rotation orbit is predicted on the basis of the rotation speed including a plurality of instant rotation speeds in a period in which the instant rotation speed tends to decrease.

Here, the instant rotation speed means a value calculated from time necessary for the crank shaft 1*a* to rotate at a predetermined rotation angle (in this embodiment, 30° CA), every time the crank shaft 1*a* rotates in such a manner.

Hereinafter, control of the engagement timing of the pinion gear 4 and the ring gear 2 will be described in detail with reference to FIG. 5.

FIG. 4 is a flowchart of a pre-mesh of a rotation number synchronous type in which the rotation number of the engine 1 and the rotation number of the pinion gear 4 are synchronized at the time of the idle stop and the engine 1 is stopped while the pinion gear 4 is engaged with the ring gear 2. A process of an operation illustrated in the control flowchart is executed repetitively by the ECU 11.

During deceleration travel until the vehicle stops, for the purpose of improvement of deceleration feeling and reduction of a fuel consumption amount, when a predetermined condition (deceleration-mode fuel cut condition) is established in step 5101, drive of the fuel injection valve 15 is stopped in step 5102. Accordingly, cutting of supplying of the fuel to the engine 1 (fuel cut) is executed and the engine brake is operated. Note that an example of the deceleration-mode fuel cut condition includes a condition that "a vehicle speed is 20 km/h or more, an engine rotation number is 1200 rpm or more, and an accelerator pedal (not shown) is not stepped on."

During the above-described execution of the deceleration-mode fuel cut, when the engine rotation number decreases to a predetermined rotation number (fuel injection recovery rotation number (for example, 1100 rpm)) to resume (recover) the fuel injection and the fuel injection recovery condition is established in step 5103, a fuel recovery process of resuming (recovering) the fuel injection is executed in a sub-routine of step 104. The sub-routine of the fuel recovery process will be described below.

At the time when a throttle opening is fully closed and the engine 1 runs under no load after the execution of the fuel recovery process in step 5104, when each input condition of the vehicle speed sensor 33, the brake switch 34 or the like satisfies the coast stop condition in step S105, drive of the fuel injection valve 15 is stopped and cutting of fuel supply of the engine 1 (fuel cut) is performed in step 5106. Note that an example of the coast stop condition includes a condition that "a vehicle speed is 14 km/h or less and a brake pedal (not shown) is stepped on."

The above-described fuel cut operation gradually decreases the engine rotation number. When the engine rotation number is equal to or less than a predetermined value A of a determination condition (for example, the engine rotation number is 600 rpm) in step 5107, the process proceeds to step 5108. A previous pinion rotation operation, that is, an operation of supplying power to the starter motor 7, increasing a pinion gear rotation number calculated from the pinion gear sensor 38 to a predetermined value, and stopping supplying of power is performed.

In this case, the above-described previous pinion rotation operation gradually decreases the pinion gear rotation number by inertia over time. Meanwhile, since the engine rotation number decreases pulsatively while suction→compression→expansion→exhaust is repeated, synchronization timing of the engine rotation number calculated from the ring gear sensor 37 and the pinion gear rotation number decreasing gradually by the previous pinion rotation operation is predicted. When a pre-mesh condition is established in step 5109, the process proceeds to step 5110. Pinion gear transfer is executed, that is, a so-called pre-mesh state in which supplying of power to the starter motor 7 and the actuator 5 starts and the rotating pinion gear 4 is engaged with the ring gear 2 via the lever 6 is achieved. Note that an example of the pre-mesh condition includes a condition that "a difference between the rotation number of the pinion gear 4 when it is assumed that the pinion gear 4 is completely synchronized with the ring gear 2 and the actual rotation number of the pinion gear 4 is within ±100 rpm."

When it is determined in step 5111 that there is no restart request from the driver such as release of the foot from the brake pedal (not shown), that is, so-called change of mind, the process proceeds to step 5112. The above-described pre-mesh state is maintained, and the internal-combustion engine body 1 is completely stopped. The process proceeds to step 5113 and a waiting state is maintained until the restart request is received.

When the restart request is received due to an operation of the driver in the waiting state in step 5113, the process proceeds to step 5116. Power is supplied to the starter motor 7, the fuel injection is resumed, and the internal-combustion engine is restarted.

In addition, when it is determined in step 5111 that there is the change-of-mind request from the driver, the process proceeds to step 5114 and it is determined whether the engine rotation number is equal to or less than a predetermined value B (for example, the engine rotation number is 600 rpm). When the engine rotation number is more than the predetermined value B, the process proceeds to step 5116 and when the internal-combustion engine rotation number is equal to or less than the predetermined value B, the process proceeds to step 5115. After drive of the starter body 3 is prohibited for predetermined time, the process proceeds to step 5116.

Subsequently, the process proceeds to step 5117 and it is determined whether the engine rotation number is equal to or more than a predetermined value C (for example, the engine rotation number is 500 rpm). When the engine rotation number is equal to or more than the predetermined value C, the process proceeds to step 5118 and drive of the starter body 3 is turned off.

As described above, since time until the pinion gear 4 engages with the ring gear 2 can be shortened by performing the pre-mesh operation of the rotation number synchronous type of the pinion gear 4 and the ring gear 2, noise generated at the time of the gear engagement can be reduced. In addition, since an operation of engaging the pinion gear 4 with the ring gear 2 becomes unnecessary at the time of next restart, start time until the internal-combustion engine is completely exploded after the restart request is received can be shortened.

Figure 6:
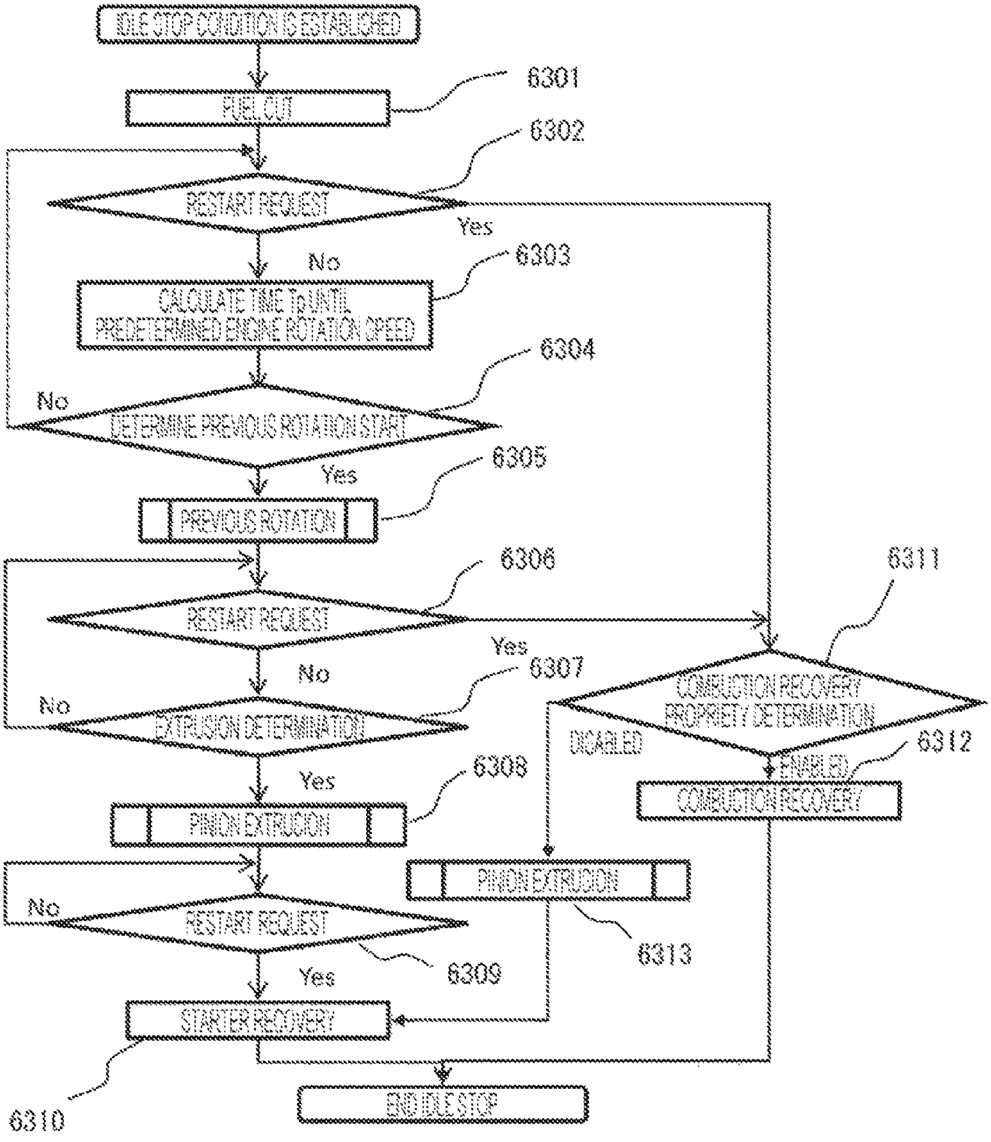
FIG. 6 is a flowchart of idle stop control.

FIG. 6 is a control flowchart when an idle stop system including the present invention is carried out, and the control flowchart is carried out inside the ECU 11. In addition, FIG. 6 illustrates an example of temporal changes of rotation speeds of the ring gear 2 and the pinion gear 4 at the time of carrying out the control, and an output signal of the ECU 11 at that time. As illustrated in FIG. 6, first, in response to the idle stop condition established, the fuel injection is stopped in step 6301. As a result, the engine rotation starts the inertial rotation. Subsequently, power is supplied to the starter motor 7. Rotation by the power supply is referred to as previous rotation. The starter motor 7 previously rotates and accordingly the pinion gear 4 previously rotates. Determination of the previous rotation start is made in step 6303. As a method of determining the previous rotation start, for example, it can be considered to use a condition that the engine rotation speed is less than a predetermined rotation speed. After the previous rotation start determination is established, power is supplied to the starter motor 6304 and the previous rotation starts in step 6304. The previous rotation ends in a given time or when the rotation speed of the pinion gear 4 reaches the predetermined rotation speed. Subsequently, the torque generated by the starter motor 7 is removed by stopping power supply and the pinion gear 4 shifts to the inertial rotation. Note that the starter motor does not need to be previously rotated in this embodiment and the present invention can be applied even in a state in which the starter motor does not rotate. The previous rotation makes it possible to engage the pinion gear 4 and the ring gear 2 smoothly even in a region where the engine rotation speed, that is, the rotation speed of the ring gear 2 is relatively high. After the previous rotation of the starter motor 7, the pinion extrusion determination is made in step 6306, and an extrusion command is output. The pinion extrusion determination is made in such a manner that the pinion gear 4 is extruded according to the determination, the rotation speeds of the ring gear 2 and the pinion gear 4 at a point of time when the pinion gear 4 comes in contact with the ring gear 2 are predicted, and extrusion timing is determined such that a rotation speed difference between the ring gear 2 and the pinion gear 4 becomes a predetermined value. That is, there is delay time (Tdelay) of a pinion extrusion unit and an extrusion command is output in advance in consideration of the delay time. That is, changes of the rotation speeds of the pinion gear 4 and the ring gear 2 during the delay time of the pinion extrusion unit, that is, during time until the pinion moves to arrive at the ring gear are predicted. Accordingly, jumping timing can be determined such that a speed difference between the ring gear 2 and the pinion gear 4 at a point of time when the pinion gear 4 comes in contact with the ring gear 2 becomes an optimal speed difference, and smooth engagement with small noise can be realized. Hereinafter, the rotation speed of the pinion gear 4 or the ring gear 2 after the delay time of the pinion extrusion unit passes is referred to as a future rotation speed. Note that prediction of the future rotation speed of the ring gear 2 is performed by the controller every moment. That is, information of the engine rotation speed every moment and the crank angle is used to predict the future rotation speed of the ring gear 2. Hereinafter, a point of time when the future rotation speed of the ring gear 2 is predicted every moment or a point of time when a crank angle signal is acquired from the crank angle sensor 236 is distinguished from a point of time after the above-described delay time of the pinion extrusion unit passes, and is tentatively referred to as a prediction start point of time. An embodiment of the pinion extrusion determination here will be described in detail later.

In response to a restart request generated after the pinion gear 4 engages with the ring gear 2, the restart is performed immediately by the starter in step 6309. Since the pinion gear 4 is engaged, immediate supply of power to the starter motor 7 and start of cranking make quick restart possible. Meanwhile, there is a possibility that the restart request be generated before the pinion gear 4 engages after the idle stop starts. In response to such a possibility, the determination of the restart request is made in steps 6302 and 6305, and the fuel injection is resumed in step 6310 to attempt the restart by combustion. In a region where the idle stop condition is established and the engine rotation number is high even after the fuel cut, the engine rotation can be recovered by resuming the fuel injection and resuming combustion. However, in a region where the engine rotation number is low, the engine may stop without recovery of the engine rotation even though the combustion is resumed. In step 6311, it is determined whether the combustion recovery of the engine has succeeded. Only when the combustion recovery has not succeeded, the pinion gear 4 is engaged with the ring gear 2 and the restart is performed by the starter motor 7 in step 6312. In the combustion recovery determination, at a point of time when the engine rotation speed is less than a predetermined value (for example, 50 r/min), it can be determined that the combustion recovery has not succeeded. In addition, at a point of time when the engine rotation speed is more than a predetermined value (for example, 500 r/min), it can be assumed that the combustion recovery is completed.

Figure 7:
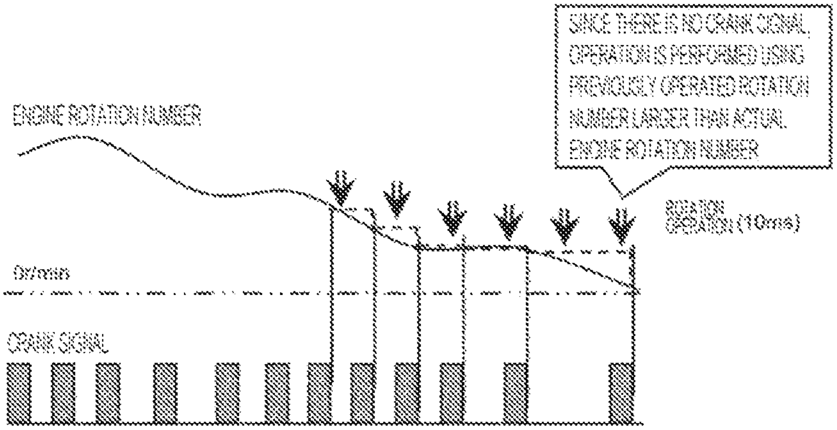
FIG. 7 is a diagram illustrating an outline of a rotation signal complement operation.
Figure 7:
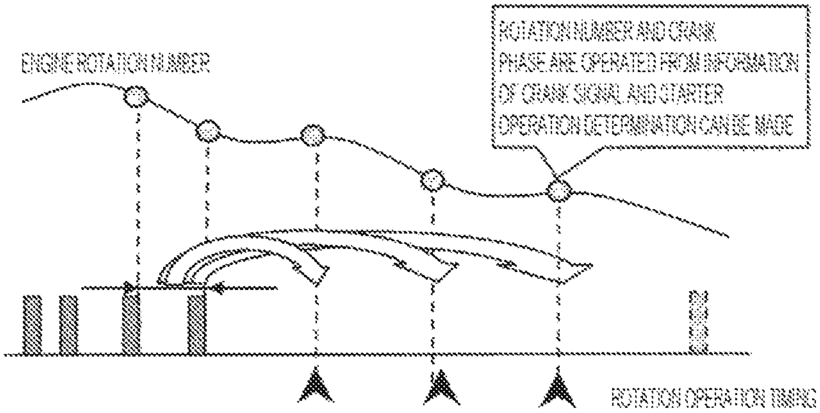

Next, a problem in the related art and an outline of a countermeasure for the problem will be described with reference to FIG. 7. Generally, the engine rotation number is obtained by using a signal from the crank angle sensor 236 to operate a crank phase and using a signal from the ring gear sensor 237 to operate an engine rotation number. These operations are performed for example every 10 ms as illustrated in FIG. 7 to be updated by the RAM 242 or the like, and are reflected in various kinds of control. Here, in a region of a low engine rotation number (for example, 200 r/min or less), an interval of crank signals used to operate the crank phase or the engine rotation number becomes longer than an interval (for example, 10 ms) of the engine rotation number operation (crank phase operation). In a period in which the crank signal is not updated, the engine rotation number or the crank phase at a point of time of the prediction start cannot be accurately operated and the future rotation number cannot be calculated with high precision. As a result, at the time of the ring gear engagement, a rotation number difference between the ring gear and the pinion gear 4 increases ($\Delta Ne \geq 50$ r/min) and abnormal sound is generated.

For this reason, as a countermeasure, in a region of a low engine rotation number in particular, a phase change of the crank shaft at a point of time of the prediction start is calculated on the basis of information of a previous crank signal, according to timing of the engine rotation number operation (crank phase operation). Accordingly, the engine rotation number and the crank phase in a period in which the crank signal is not updated are calculated. In this way, the future engine rotation number can be predicted with high precision by complementing signal information in the period in which the crank signal is not updated, and the pinion gear 4 can be engaged with the ring gear 2 without generating the abnormal sound by reducing a difference between the rotation number of the ring gear and the pinion gear (for example, $\Delta Ne \leq 50$ r/min).

Next, a method of predicting the future rotation speed of the ring gear 2 will be described with reference to FIGS. 8 and 9. Different from a steady change in which a speed decreases at a constant change rate illustrated by a broken line portion in FIG. 9, in the engine rotation speed change during the inertial rotation, the change rate (angular acceleration) of the engine rotation speed changes periodically according to the crank angle (due to compression and expansion of air inside a combustion chamber). This change is referred to as a phase change hereinafter. In this embodiment, particularly, the phase change of the engine rotation speed is operated with high precision and the future engine rotation speed, that is, the future rotation speed of the ring gear 2 is predicted.

The phase change of the engine rotation speed changes periodically according to the crank angle and is obtained as a change rate of the engine rotation speed using the crank angle as a parameter. FIG. 8 is a graph illustrating a relation of the crank angle and the acceleration of the engine rotation speed during the inertial rotation of the engine.

Note that this example is an example of a three-cylinder engine and the crank angle has zero degree in a place where a cylinder in a compression stroke reaches a top dead center (TDC). In a four-cycle engine, since the crank shaft has one cycle by two rounds, a different cylinder has the same phase every time the crank shaft rotates by 240 degrees, in the case of the three-cylinder engine. For this reason, the rotation speed of the engine is accelerated and decelerated periodically every time the crank shaft rotates by 240 degrees.

Figure 8:
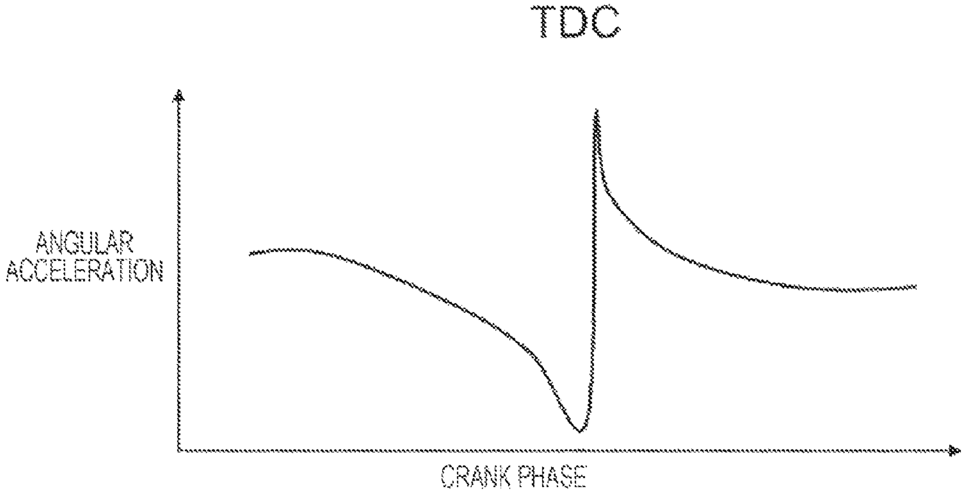
FIG. 8 is a diagram illustrating a phase change of an engine rotation number.
Figure 9:
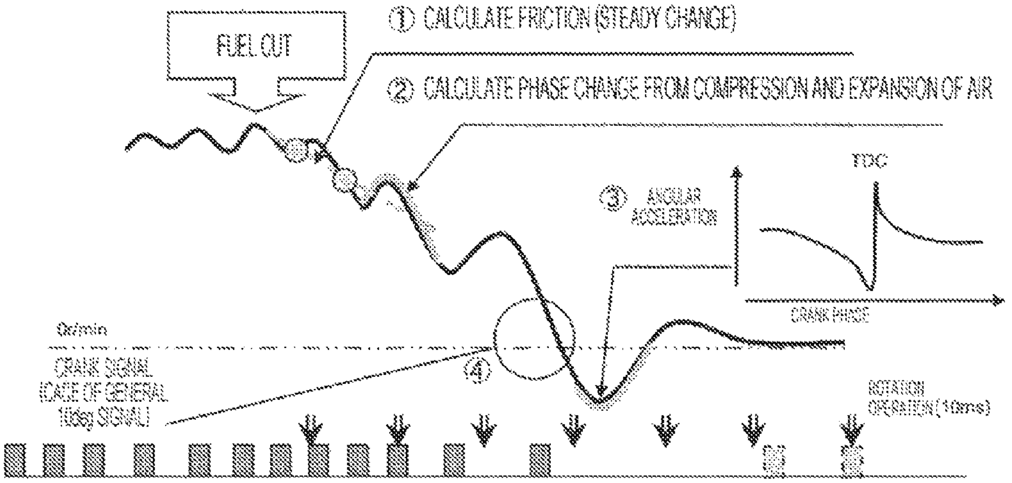
FIG. 9 is a diagram illustrating prediction of a future engine rotation number.

In addition, in the case of the four-cylinder engine, since the rotation speed of the engine is accelerated and decelerated periodically every time the crank shaft 1*a* rotates by 180 degrees, a function in FIG. 8 becomes up to 180 degrees in the case of the four cylinders. A change rate (=acceleration) of the engine rotation speed can be obtained by referring to the relation of the crank angle phase and the angular acceleration with respect to the engine rotation behavior during the inertial rotation. When the crank angle signal from the crank angle sensor 236 is not updated, the engine rotation acceleration is time-integrated analytically or numerically using an engine rotation speed and a crank phase acquired previously as an initial condition. Accordingly, an engine rotation speed at any time in a period in which the crank angle signal from the crank angle sensor 236 is not updated can be predicted. For example, the relation of the crank phase and the angular acceleration can be time-integrated numerically as follows. A change amount of the engine rotation speed after the minute time can be obtained by using the relation of the crank phase and the angular acceleration from information of a plurality of previous crank angle signals to calculate acceleration and applying minute time. For example, the engine rotation speed after the minute time can be obtained by adding the change amount of the engine rotation speed after the minute time to the engine rotation speed of the initial condition such as a last-acquired signal value. In addition, the change amount of the crank angle after the minute time can be obtained by applying the minute time to the engine rotation speed of the initial condition. The crank angle after the minute time can be obtained by adding the change amount of the crank angle after the minute time to the crank angle of the initial condition. In this way, the engine rotation speed and the crank angle after the minute time are continuously calculated. Accordingly, the engine rotation number and the crank phase at any time of the period in which the crank angle signal from the crank angle sensor 236 is not updated are complemented, and a future engine rotation speed is predicted. Note that the complementing the engine rotation number and the crank phase in the period in which the crank angle signal is not updated (a period in which the engine rotation number is low) desirably includes, but not limited to, using a signal from the crank angle sensor 236 having high resolution to complement an interval of a signal from the ring gear sensor 237 and a signal from the crank angle sensor 236. For example, previous measurement values acquired from the ring gear sensor 237 may be used to complement a signal interval of the ring gear sensor 237.

Next, an outline of a future engine rotation number prediction unit will be described with reference to FIG. 9. In the attenuation behavior of the engine rotation number during the inertial rotation, friction may change according to a state of the engine such as a temperature, a load, and total operation time, and it can be considered that an individual difference is also generated at the time of mass production. When only a relation 401 created in advance and illustrated in FIG. 8 of the crank phase and the phase change of the angular acceleration is used, it is not possible to sufficiently correspond to a change of the state of the engine and prediction of the future engine rotation speed may be different from the actual engine rotation speed. In response to this, when the future engine rotation speed is predicted, a steady change of the engine rotation speed is added on the basis of transition of a previous actual engine rotation speed (acquired from the ring gear sensor 237, for example) until a point of time of the prediction start, and the acceleration is measured. A correspondence relation of the acceleration by the steady change and the acceleration of the phase change is always updated, and can be used for the prediction of the future engine rotation speed. Information of the steady change and the phase change is stored in the ECU 11, and the correspondence relation is always updated to be used for the prediction of the future engine rotation speed. Accordingly, it is possible to correspond to the change of the engine rotation behavior flexibly and it is also possible to perform more accurate prediction.

When the method of predicting the engine rotation speed is used, the future engine rotation speed at any time can be predicted. In addition, since it can be assumed that the rotation speed of the pinion gear 4 during the inertial rotation after the previous rotation decreases at constant deceleration as with the steady change of the ring gear 2, the future rotation speed of the pinion gear 4 can be predicted in a linear relation. Therefore, a future rotation speed difference between the ring gear 2 and the pinion gear 4 can be predicted by combining the future rotation number prediction of both the ring gear 2 and the pinion gear 4.

Next, a future rotation number prediction technique of the ring gear 2 will be described in detail with reference to FIG. 10. An engine rotation number complement unit 1001 adds a rotation number change of the minute time to a previous engine rotation number last operated and corresponding to the initial condition, and complements an engine rotation number in a period in which a signal from the crank angle sensor 236 or the ring gear sensor 237 cannot be obtained. For the rotation number change, a signal of either the crank angle sensor 236 or the ring gear sensor 237 may be used, but information of the crank angle sensor 236 having higher resolution is desirably used.

A crank phase complement unit 1002 adds a crank phase change of the minute time to a previous crank phase last operated on the basis of a signal of the crank angle sensor 236 and corresponding to the initial condition, and complements a crank phase in the period in which the signal of the crank angle sensor 236 cannot be obtained. For the crank phase change, a signal of either the crank angle sensor 236 or the ring gear sensor 237 may be used, but information of the crank angle sensor 236 having higher resolution is desirably used. A phase change operation unit 1003 uses crank phase information complemented by the crank phase complement unit 1002 to apply an angular acceleration change depending on the crank phase to the engine rotation number, and calculates a phase change affecting the engine rotation number until predetermined time such as the delay time of the pinion extrusion unit passes. For example, the angular acceleration until the predetermined time passes may be differentiated on the basis of the relation of the crank phase and the angular acceleration in FIG. 8.

A steady change operation unit 1004 operates, for example, an inclination when it is assumed that the engine rotation number decreases at constant deceleration, from engine rotation numbers previously operated a plurality of times on the basis of the ring gear sensor 237, and calculates a steady change affecting an engine rotation number until the delay time of the pinion extrusion unit passes.

A starter control unit 1005 controls an operation of the starter motor 7 on the basis of an engine rotation number after the delay time of the pinion extrusion unit passes, which is predicted from the engine rotation number acquired from the engine rotation number complement unit 1001, the phase changes of the engine rotation number acquired from the phase change operation unit 1003 and the steady change of the engine rotation number acquired from the steady change operation unit 1004. Examples of the control of the operation of the starter include executing determination of power supply start (previous rotation before engagement) timing, power supply end timing, pinion extrusion timing by the actuator 5, and power supply start timing of the starter motor 7 after the engagement of the ring gear 2 and the pinion gear 4, or permission/prohibition determination of the above-described control.

Figure 10:
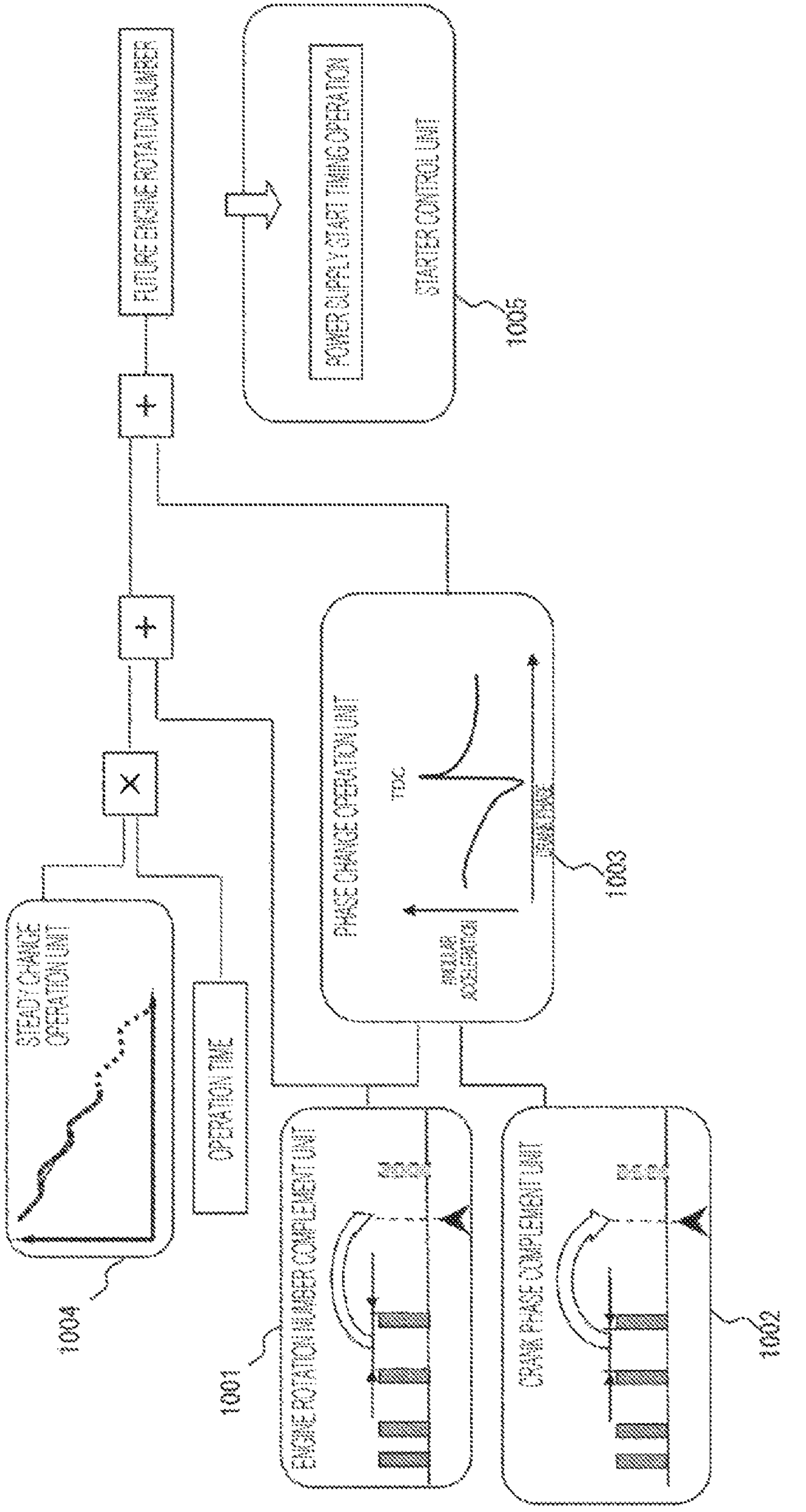
FIG. 10 is a detailed diagram illustrating prediction of a future engine rotation number.

A process illustrated in FIG. 10 is executed at an interval shorter than an update interval of signals relating to the engine rotation number (for example, signal interval of the crank angle sensor 236). Accordingly, an operation command of the starter can be executed with good control, even when the update interval of the signals relating to the engine rotation number is long. As illustrated in an example in FIG. 11, since an operation interval of the process in FIG. 10 is shorter than an interval of the crank signals, the control of the starter can be executed with high precision.

Note that the process illustrated in FIG. 10 does not need to be carried out completely. For example, when the signal interval of the crank angle sensor 236 is long (when the engine rotation number is low), only a complement operation by the crank phase complement unit 1002 may be performed to be reflected in the operation command of the starter motor 7, particularly in view of the fact that the crank phase not to be updated largely affects the prediction of the future engine rotation number.

In addition, the engine rotation number complement unit 1001 and the crank phase complement unit 1002 do not need to perform the complement on the basis of the signals of the crank angle sensor 236 and the ring gear sensor 237, and the complement of the period in which the signal is not updated may be performed on the basis of information previously acquired from the phase change operation unit 1003 or the steady change operation unit 1004.

In addition, the process illustrated in FIG. 10 may be stored in a storage device such as the ROM 241 and may be implemented as a program executed by the operation processing device 223 or may be implemented by hardware.

In this way, in step 304 or step 307 in FIG. 6, jumping determination of the pinion is performed on the basis of the ring gear rotation speed and the pinion rotation speed predicted after the predetermined time (Tdelay) passes, on the basis of the process in FIG. 10. FIG. 8 illustrates a more specific embodiment of the pinion extrusion determination in step 306 in FIG. 6. In the pinion extrusion determination, the pinion gear 4 comes in contact with the ring gear 2 at a point of time when a rotation speed difference of the future engine rotation speed and the rotation speed of the pinion gear 4 becomes a predetermined value.

Next, an example of the process illustrated in FIG. 10 will be described. Even in this method, the engine rotation number prediction method illustrated in FIG. 10 is used to predict an engine rotation speed after the predetermined time (Tdelay) passes. In addition, here, when the process of the phase change operation unit 1003 is carried out by the ECU 11, the future engine rotation speed is arranged as a table having an engine rotation speed at a point of time of the prediction start and a crank angle at a point of time of the prediction start as items, and the future engine rotation speed can be calculated by referring to the table. The table is created in advance from the relation of the crank angle and the angular acceleration in FIG. 8 and is stored in the ROM 241, for example. In this example, the engine rotation speed at a point of time of the prediction start is set as a longitudinal item, and the crank angle at a point of time of the prediction start is set as a transverse item. Information at a point of time of the prediction start can be used to obtain an engine rotation speed after Tdelay seconds by referring to the table. The phase change and the steady change of the engine rotation speed may be arranged individually as tables or may be prepared as the same table. In addition, the pinion rotation speed after Tdelay seconds can be predicted by assuming that the rotation speed of the pinion gear 4 during the inertial rotation decreases with certain slope over time. For this reason, an operation process load is relatively small even though a table is not prepared. In addition, a state change of the vehicle can be corresponded flexibly by preparing a plurality of tables in advance according to an operating state of the vehicle and changing a reference table according to a position of a shift lever, the temperature or the load of the engine, and the like. An example of determining complement operation execution propriety of the engine rotation number and the like in FIG. 10 will be described with reference to FIG. 12.

Figure 11:
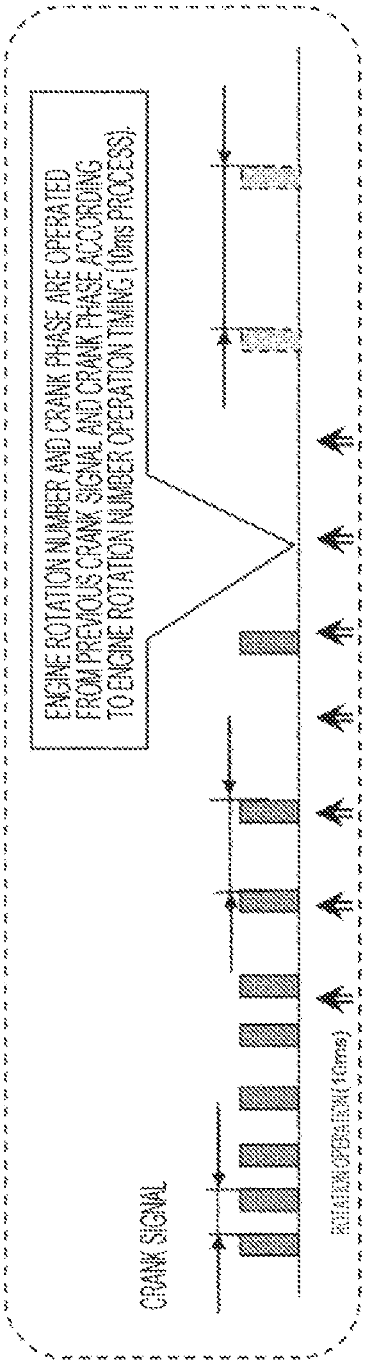
FIG. 11 illustrates an example of operation timing of the rotation signal complement operation and starter control.
Figure 12:
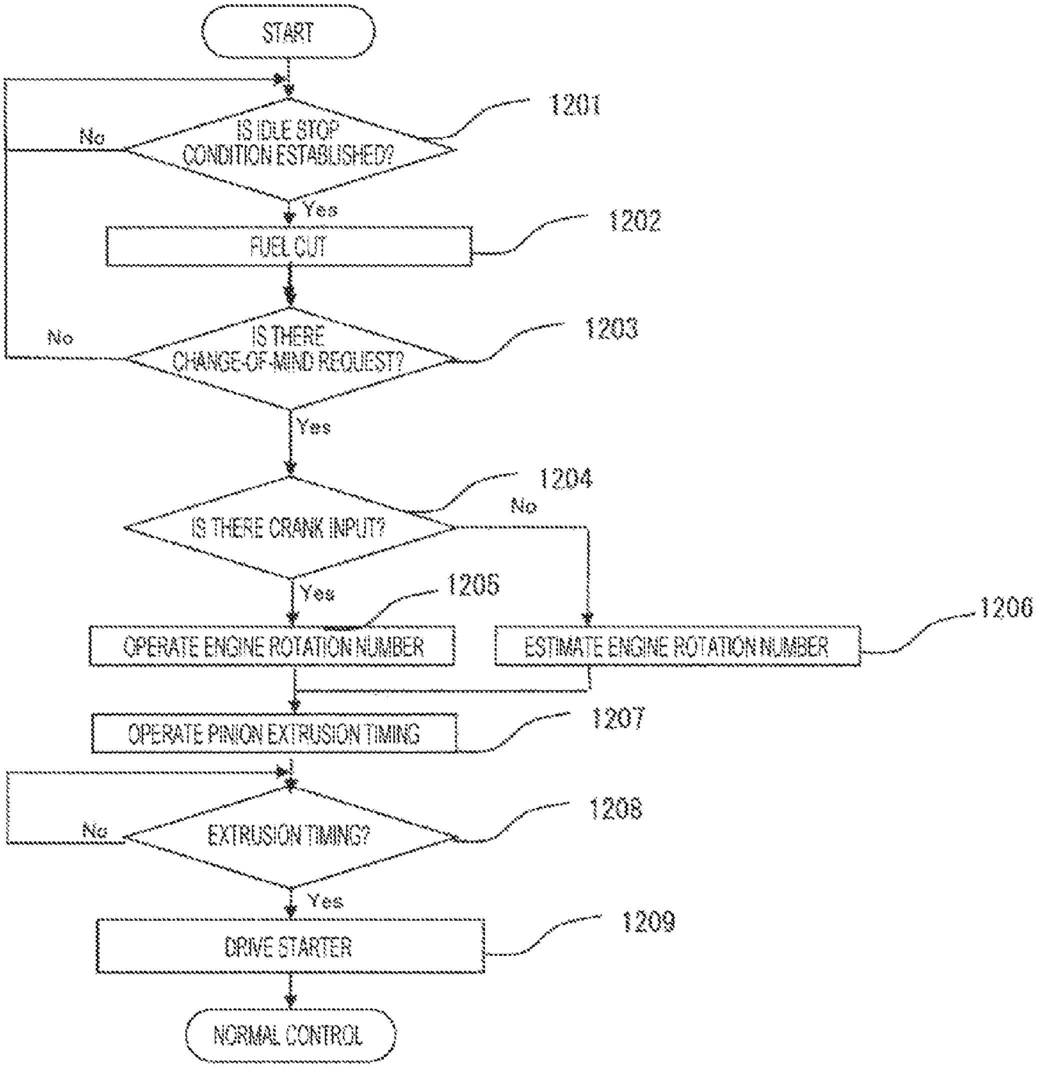
FIG. 12 is a flowchart of determining whether or not to execute the rotation signal complement operation.

In FIG. 12, in step 1204, it is determined whether a signal is input from the crank angle sensor 236. The determination may be executed with an engine rotation number operation period and a crank phase operation period (for example, every 10 ms) as illustrated in FIGS. 7, 9, and 11, for example. When the signal of the crank angle sensor 236 is updated, the engine rotation number and the crank phase are operated on the basis of the input signal in step 1205. When the signal of the crank angle sensor 236 is not updated, at least one of the engine rotation number complement unit 1001 and the crank phase complement unit 1002 is operated in step 1206. In this way, for example, when the engine rotation number is high and a signal interval of the crank angle sensor is sufficiently short, the complement operation does not need to be performed and an operation process load can be reduced.

Note that instead of the process of step 1204, it may be determined whether the engine rotation number is lower than a predetermined region. For example, it is anticipated that when a last-operated engine rotation number is low, the signal interval of the crank angle sensor 236 increases. For this reason, only in this case, the engine rotation number complement unit 1001 or the crank phase complement unit 1002 can be executed.

In the following step 1207, extrusion timing of the pinion gear 4 by the actuator 5 is operated on the basis of the operation result of the engine rotation number described in FIG. 10. Here, a plurality of stored instant rotation speeds NES are read and necessary time TP until engagement of the pinion gear 4 and the ring gear 2 is calculated on the basis of the read instant rotation speeds NES. Next, extrusion timing tp2 of the pinion gear 4 is calculated on the basis of the calculated necessary time TP. Specifically, extrusion operation time TA until engagement of the pinion gear 4 after extrusion start of the pinion gear 4 is subtracted from the necessary time TP to calculate time (TP−TA), and a point of time after the time (TP−TA) passes from a starting point is set as the extrusion timing tp2 of the pinion gear 4.

In step 1208, it is determined whether timing is the extrusion timing tp2 of the pinion gear 4. At a point of time when the timing is the extrusion timing tp2, the process proceeds to step 1209. The switch 13*a* for supplying power to the magnet switch is turned on, and supplying of power to the actuator 5 starts. Accordingly, the pinion gear 4 is extruded to the ring gear 2 and the pinion gear 4 and the ring gear 2 engage.

Note that in a period including the extrusion timing tp2 operated in step 1208, the extrusion timing tp2 may be updated again, for example by confirming the update of the signal of the crank angle sensor 236 and adopting an update value or executing the process in step 1206 again. Accordingly, when the signal of the crank angle sensor 236 or the like is updated after the extrusion timing of the pinion gear is operated and more accurate future rotation number information can be operated, the future rotation number information can be updated and the extrusion timing tp2 can be updated again.

Note that the example of the operation of the extrusion timing tp2 of the pinion gear 4 is illustrated in FIG. 12; however, this is an example of the control of the starter control unit 1005 in FIG. 10 and may be other control as long as the control includes an operation command using the future rotation number. That is, as described above, this may be used for determination of the power supply start (previous rotation before engagement) timing, the power supply end timing, the pinion extrusion timing by the actuator 5, the power supply start timing of the starter motor 7 after the engagement of the ring gear 2 and the pinion gear 4, and the like.

Figure 5:
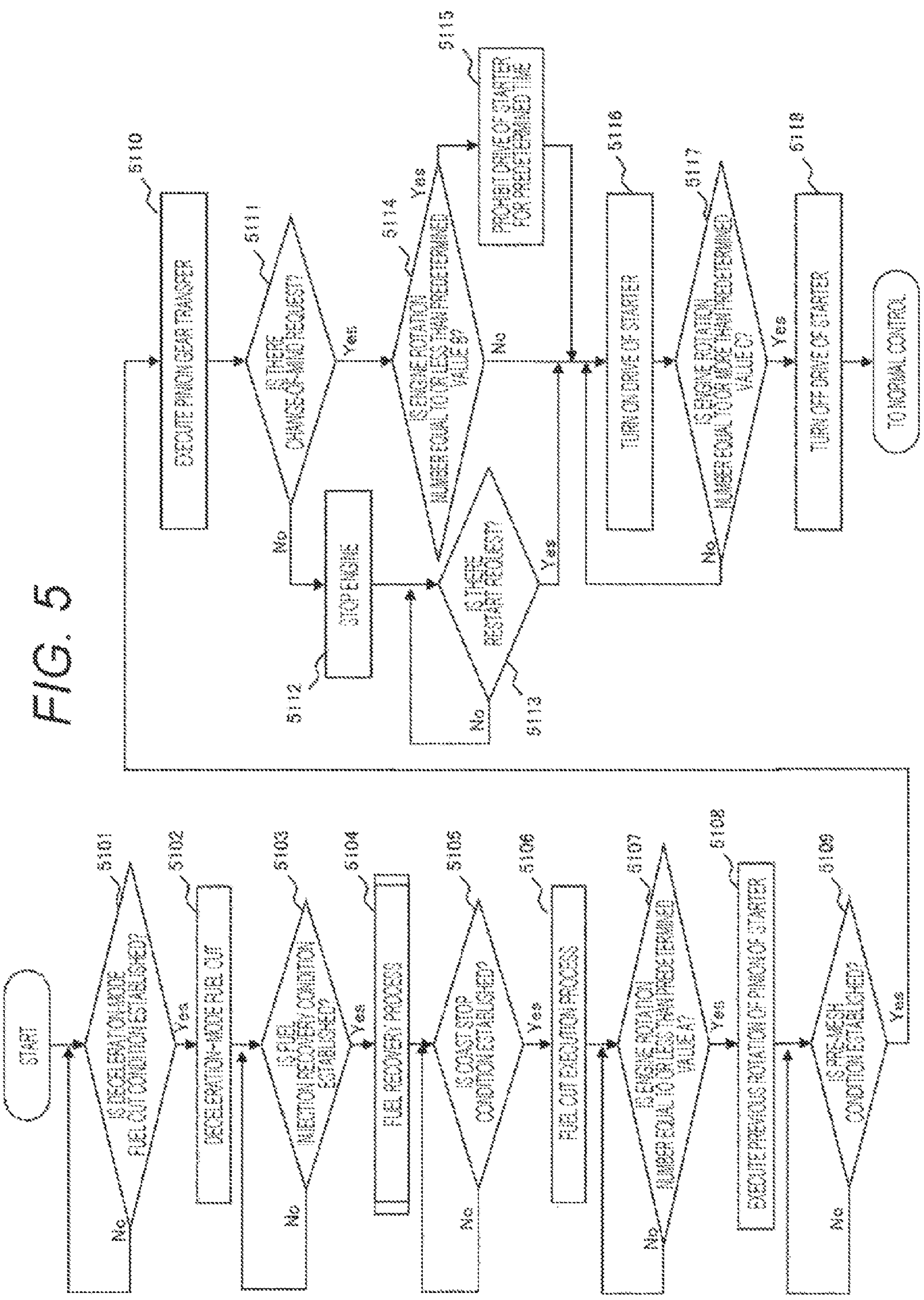
FIG. 5 is a flowchart of engagement of a pinion gear and a ring gear.

Note that as illustrated in step 5108 in FIG. 5 or step 6305 in FIG. 6, the embodiment in which power is supplied in advance to the starter motor 7 before engagement with the ring gear 2 and the previous rotation is performed has been described; however, the embodiment is not limited thereto. For example, an aspect of predicting the future rotation number of the ring gear 2 without executing the previous rotation to perform engagement control at desired timing is also included in the example of the control of the starter control unit 1005.

According to this embodiment described in detail above, the following excellent effects can be obtained.

During the inertial rotation after the automatic stop of the engine, a complement value of a detection signal of the crank angle sensor 236 is used to predict an engine rotation speed in a rotation region that cannot be calculated from the detection signal and control such as engagement of the pinion gear 4 and the ring gear 2 is carried out at a desired engine rotation speed within a region of the prediction result. For this reason, for example, the engagement of the pinion gear 4 and the ring gear 2 can be carried out at optimal timing and then the bite-in sound upon the engagement of the pinion gear 4 and the ring gear 2 can be suppressed. Further, when the instant rotation speeds NES reaches a period TDW in which the speed decreases monotonously to zero, the plurality of instant rotation speeds NES is used to predict the rotation orbit in the period TDW. For this reason, this configuration is suitable for accurately predicting the rotation orbit at the speed close to zero without increasing the engine rotation speed. In addition, at this time, the instant rotation speeds NES within the period TDW in which the speed decreases monotonously or in a period as close as to the period TDW is used to predict the rotation orbit. For this reason, a prediction system of the rotation orbit can be improved.

In addition, in the rotation sensor such as the crank angle sensor 236 and the ring gear sensor 237, a pulse signal interval increases in the low rotation speed region and the engine rotation speed cannot be calculated at predetermined operation timing. Since the rotation orbit in the extremely low rotation speed region is complemented, the control of, for example, the engagement of the pinion gear 4 and the ring gear 2 can be carried out at optimal timing even in the extremely low rotation speed region.

In addition, timing at which the actual engine rotation speed becomes zero is estimated on the basis of the predicted rotation orbit, and the engagement process of the pinion gear 4 is carried out at the estimated timing or timing close to the estimated timing. For this reason, this configuration is significant for suppressing the engagement of the pinion gear 4 and the ring gear 2. In addition, the above-described engagement can be carried out at the timing at which the speed first becomes zero by the inertial rotation after the automatic stop of the engine. As a result, the pinion and the ring gear can engage at time as early as possible. That is, this configuration is suitable for reliably completing the engagement of the pinion and the ring gear before a next engine restart request.

In addition, the extrusion timing tp2 of the pinion gear 4 is determined on the basis of the predicted rotation orbit and the extrusion operation time TA necessary for the extrusion operation of the pinion gear 4. For this reason, the engagement of the pinion gear 4 and the ring gear 2 can be performed at appropriate timing.

Figure 13:
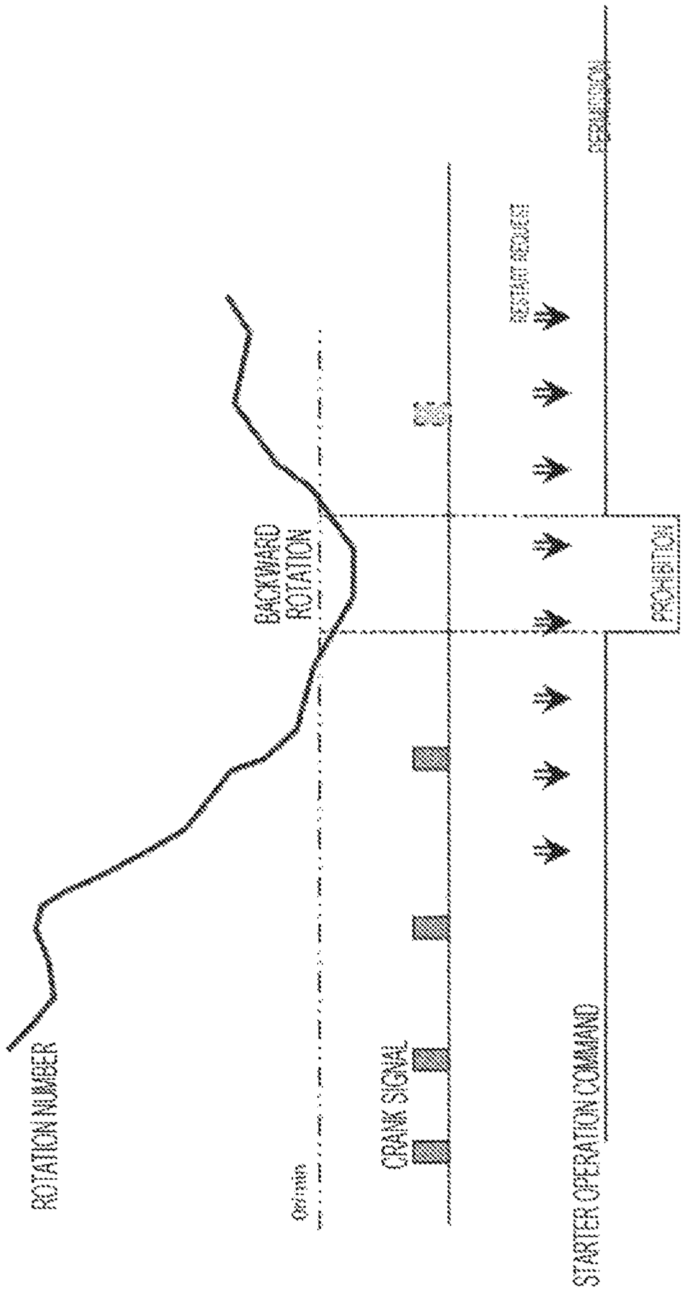
FIG. 13 illustrates an operation example when engine swing-over is generated.

In addition, FIG. 13 illustrates an example of an operation of the present invention in a low engine rotation number in which a crank signal interval increases and swing-over (backward rotation) of the engine 1 is generated in particular, and an effect thereof.

When the engine rotation number is a negative value, that is, when the pinion gear 4 and the ring gear 2 engage in a situation in which the swing-over of the engine 1 is generated, and the starter motor 7 is driven to rotate, force in a backward rotation direction is transmitted to the starter motor 7 and a failure of the starter motor 7 or an increase of consumption power occurs. For this reason, when the engine rotation number is the negative value, the starter control unit 1005 prohibits an operation of the starter motor 7. Here, the swing-over of the engine 1 is not necessarily generated when the engine 1 stops and may also be generated at a time interval shorter than the signal interval of the crank angle sensor 236. It has been very difficult to detect the generation of the swing-over when the crank signal interval is long.

In the present invention, the interval of the crank angle signals is also complemented in the region of the low engine rotation number and the starter operation is executed at an interval shorter than the interval of the crank angle signals, on the basis of the complement information. For this reason, even though, for example, the driver steps on the brake pedal immediately before the engine stops (timing at which the crank signal interval increases) and the engine restart request is generated at any timing, the swing-over of the engine 1 can be detected and the operation command of the starter can be changed.

As described above, the present invention relates to an engine stop/start control device that has an automatic stop/start function of automatically stopping an engine when a predetermined automatic stop condition is established, starting cranking by a starter when a predetermined restart condition is subsequently established, and restarting the engine, carries out cranking at restart of the engine in a state in which a pinion of the starter engages with a ring gear connected to an output shaft of the engine, and releases the engagement after the cranking ends. Particularly, the invention described in the claims includes a rotation speed calculation unit which calculates an engine rotation speed on the basis of a detection signal of a rotation sensor which detects rotation of the output shaft, a prediction unit which predicts a rotation orbit of inertial rotation of the engine on the basis of the engine rotation speed calculated by the rotation speed calculation unit in a period in which the engine inertially rotates after the automatic stop of the engine, and a control unit which controls engagement timing of the pinion and the ring gear on the basis of the rotation orbit predicted by the prediction unit.

In short, in the idle stop control, the pinion needs to be engaged with the ring gear during the inertial rotation of the engine after the automatic stop of the engine. In this case, in order to suppress the bite-in sound of the pinion and the ring gear, the engagement is desirably carried out in a predetermined engine rotation speed region (extremely low rotation speed region) in which an effect of suppressing the sound is high. However, in the rotation sensor which detects the rotation of the engine output shaft, there is a limitation in an engine rotation speed at which a detection signal can be output, and there is a case where the engine rotation speed in the extremely low rotation speed region cannot be calculated with high precision. In this case, the engagement of the pinion and the ring gear cannot be carried out at optimal timing and there is a risk that the bite-in sound increases.

In view of the above-described point, in the present invention, during the inertial rotation after the automatic stop of the engine, a calculation value based on a detection signal of the rotation sensor is used to predict the engine rotation speed in the region that cannot be calculated from the detection signal. In addition, drive of the pinion is controlled such that the above-described engagement is carried out at a desired engine rotation speed within a region of the prediction result. Accordingly, the engagement of the pinion and the ring gear can be carried out at the optimal timing and then the bite-in sound upon the engagement of the pinion and the ring gear can be suppressed.

In addition, the rotation speed calculation unit calculates an instant rotation speed serving as the engine rotation speed calculated from time necessary for rotation at a predetermined rotation angle of the output shaft, and the prediction unit predicts the rotation orbit on the basis of a plurality of instant rotation speeds in a period in which the instant rotation speed tends to decrease. The instant rotation speed increases and decrease repetitively. However, in the period in which the instant rotation speed tends to decrease, inclination of the engine rotation speed toward the speed of zero, that is, the rotation orbit toward the speed of zero can be predicted. Here, the instant rotation speed used for the prediction of the rotation orbit only needs to include at least the plurality of instant rotation speeds in the period in which the instant rotation speed tends to decrease, and the rotation orbit may be predicted only by the instant rotation speeds in the above-described period, or instant rotation speeds immediately before the above-described period (for example, instant rotation speeds in a period in which the instant rotation speed tends to increase) may be added and the rotation speed may be predicted.

REFERENCE SIGNS LIST

1 engine
2 ring gear
4 pinion gear
5 actuator
7 starter motor
11 ECU
236 crank angle sensor
237 ring gear sensor
1001 engine rotation number complement unit
1002 crank phase complement unit
1003 phase change operation unit
1004 steady change operation unit
1005 starter control unit

The invention claimed is:

1. A vehicle control device, comprising:
an automatic stop unit which automatically stops an engine on the basis of an operating state of a vehicle;
an automatic start unit which controls a starter during a period until the engine completely stops after the automatic stop unit executes an automatic stop of the engine, and restarts the engine; and
an engine rotation detection unit which detects or calculates a crank phase of a crankshaft of the engine or a rotation number of the engine,
wherein the automatic start unit determines whether controlling the starter is prohibited at an interval shorter than an update interval of a signal of the engine rotation detection unit and outputs a control command based on a determination result.

2. The vehicle control device according to claim 1, comprising:
an engine rotation detection signal complement unit which complements at least one of the rotation number and the crank phase of the engine at a point of time when the signal of the engine rotation detection unit is not updated, on the basis of at least one of the rotation number and the crank phase of the engine; and
a rotation number/phase change calculation unit which obtains a rotation number/phase change of the engine until a predetermined time passes, on the basis of a calculation result of the rotation detection signal complement unit,
wherein the automatic start unit controls the starter on the basis of the rotation number/phase change.

3. The vehicle control device according to claim 2, comprising:

a rotation number steady change calculation unit which obtains a rotation number steady change of the engine until the predetermined time passes, on the basis of the signal of the engine rotation detection unit or the calculation result of the engine rotation detection signal complement unit; and a future rotation number prediction unit which predicts the rotation number of the engine after the predetermined time passes, on the basis of a calculation result of the rotation number/phase change calculation unit and a calculation result of the rotation number steady change calculation unit, wherein the automatic start unit controls the starter, on the basis of a prediction result of the future rotation number prediction unit.

4. The vehicle control device according to claim 3, wherein the engine rotation detection signal complement unit complements both the engine rotation number and the crank phase at a point of time when the signal of the engine rotation detection unit is not updated.

5. The vehicle control device according to claim 3, wherein a control timing of the starter is calculated on the basis of a prediction result of the future rotation number prediction unit and confirmation whether the signal of the engine rotation detection unit is updated is made in a period until the calculated control timing of the starter.

6. The vehicle control device according to claim 3, wherein the engine rotation detection signal complement unit uses a previous calculation result of the future rotation number prediction unit to complement the signal of the engine rotation detection unit.

7. The vehicle control device according to claim 3, wherein the engine rotation detection signal complement unit determines whether or not to complement at least one of the rotation number and the crank phase of the engine, on the basis of the rotation number of the engine or a signal interval of the engine rotation detection unit.

8. The vehicle control device according to claim 3, wherein the future rotation number prediction unit predicts the rotation number of the engine taking into consideration a delay time period during which a pinion gear of the starter is moved to a ring gear side of the engine.

9. The vehicle control device according to claim 3, wherein a control timing of the starter is calculated a plurality of times, on the basis of a prediction result of the future rotation number prediction unit.

10. The vehicle control device according to claim 3, wherein the automatic start unit controls the starter, on the basis of a detection result of backward rotation of the engine.

11. The vehicle control device according to claim 3, wherein the future rotation number prediction unit refers to a table based on axes of the rotation number and the crank phase calculated in advance, and predicts the rotation number of the engine after a predetermined time passes.

12. The vehicle control device according to claim 1, wherein, when the rotation number of the engine is equal to or less than a predetermined rotation number, the vehicle control device complements at least one of the rotation number and the crank phase of the engine at a point of time when the signal of the engine rotation detection unit is not updated, on the basis of at least one of the rotation number and the crank phase of the engine.

13. A starter for restarting an engine, the starter being controlled by a vehicle control device according to claim 1.

* * * * *